3,022,143
PROCESS FOR DRYING HYDROGEN CYANIDE

Robert Allen Yeo, Cincinnati, Ohio, assignor to E. I. du Pont de Nemours and Company, Wilmington, Del., a corporation of Delaware
No Drawing. Filed Mar. 10, 1959, Ser. No. 798,319
1 Claim. (Cl. 23—293)

This invention relates to a process for drying hydrogen cyanide and is more particularly concerned with removal of water from hydrogen cyanide with a desiccant to produce extremely dry hydrogen cyanide.

Commercial hydrogen cyanide contains a small but significant amount of water. A suitable method for decreasing the water content below about 0.1% by weight has not been available and the amount is considerably higher in normal production. Even as small an amount as 0.1% is objectionable in some organic syntheses because it causes by-product formation, so a method for drying to lower water content is often highly desirable.

It is an object of this invention to provide a method by which hydrogen cyanide can readily be dried to contain less than 0.05% water. Other objects will become apparent from the specification and claims.

In accordance with the present invention, such hydrogen cyanide is effectively dried to extremely low water content by contacting liquid hydrogen cyanide with dehydrated crystalline zeolite to selectively adsorb the water from the hydrogen cyanide. The zeolite is then separated from the hydrogen cyanide and can be used for further drying treatment until it becomes saturated with water under the conditions used. The spent zeolite is then readily regenerated for reuse by heating to vaporize the adsorbed water, preferably at 300°–600° F., and removing the water vapor with a stream of air or other gas. Thus conventional drying procedures are suitable for regenerating spent zeolite.

Crystalline zeolites are hydrated sodium and/or calcium aluminum silicates which dehydrate without apparent collapse or rearrangement of the crystal structure to give a highly porous product having a network of pores and cavities amounting to as much as one-half of the total volume of the crystals. These voids are quite uniform in size and extremely small, of only about 4 to 5 angstrom units in diameter. The crystalline zeolites include synthetic or naturally occurring zeolites, such as chabazite, analcite, gmelinite, harmotome, phacolite, etc., and modifications of these produced by base exchange. A particularly suitable zeolite adsorbent is produced by removing water of hydration from synthetic crystalline zeolite consisting principally of a sodium zeolite of the approximate formula $Na_2O \cdot Al_2O_3 \cdot 2SiO_2 \cdot XH_2O$. Such dehydrated synthetic zeolite crystals are available commercially from the Linde Air Products Company and designated "Linde Type 4A Molecular Sieve."

The dehydrated crystalline zeolite is conveniently used in the form of pellets. The hydrogen cyanide is treated in any of the ways in which liquids are conventionally treated with zeolites or ion exchange resins for purposes such as water-softening. It will usually be desirable to pass the hydrogen cyanide liquid through a bed or packed column of the dehydrated zeolite. When the zeolite becomes spent, the flow of hydrogen cyanide is diverted to a fresh bed or packed column, hydrogen cyanide is drained from the spent zeolite, and the spent zeolite is regenerated for another adsorption cycle. The zeolite will absorb up to 3% of its weight of water before it becomes ineffective. The length of an adsorption cycle can be determined by trial or calculated from the weights of materials involved. The liquid hydrogen cyanide can also be contacted with the zeolite in a moving bed or a fluidized bed, or can simply be slurried with the zeolite and then separated by gravity or filtration. Any temperature can be used at which it is convenient to maintain the hydrogen cyanide in liquid form. A convenient temperature will usually be substantially that of the room, or prevailing weather, if outside, but considerably higher or lower temperatures are satisfactory.

The following examples, in which parts are by weight, illustrate specific embodiments of the invention:

Example 1

Liquid hydrogen cyanide was introduced into a column packed with dehydrated crystalline sodium zeolite dried at 430° F. The water content of the hydrogen cyanide was determined before and after treatment by the Karl Fisher method. The water content analyzed 0.333% before treatment. After the hydrogen cyanide had contacted the zeolite for one-half hour at room temperature, analysis showed 0.031% water, i.e., 93% of the initial water was removed. There was no indication of hydrogen cyanide polymerization, although polymerization would have been anticipated from the alkaline nature of the adsorbent.

The example was repeated with other drying agents in place of dehydrated zeolite adsorbent for comparison. In order to remove as much water as possible, the contact time was increased to one hour, with other conditions the same as before. From the results summarized in the following table it is evident that the zeolite is surprisingly more effective:

| Drying agent | Percent water removed from hydrogen cyanide |
|---|---|
| Silica gel | 50 |
| Alumina gel | 68 |
| Anhydrous calcium sulfate | 74 |
| Dehydrated zeolite | 93 |

Example 2

A column was packed with ¼ inch pellets of dehydrated crystalline synthetic sodium zeolite ("Linde Type 4A Molecular Sieve"). The column was purged with sulfur dioxide until the alkali was substantially neutralized to avoid any possibility of hydrogen cyanide polymerization during treatment. Liquid hydrogen cyanide was passed through the column at about 70° F. at a rate of 10 parts/hour of hydrogen cyanide for each one part of zeolite adsorbent. After one hour the flow of hydrogen cyanide was directed through a second column and the first column was regenerated for reuse by removing the adsorbed water. The water content of the hydrogen cyanide was decreased to about 0.02% from an initial value of 0.11% water by this treatment. The value of 0.02% is about the lower limit of detection by the Karl Fisher method used.

Since many different embodiments of the invention may be made without departing from the spirit and scope thereof, it is to be understood that the invention is not limited by the specific illustrations except to the extent defined in the following claim.

I claim:

The method of removing small amounts of water from hydrogen cyanide which comprises contacting liquid hydrogen cyanide containing 0.1% to 0.4% of water with sufficient dehydrated crystalline zeolite to selectively adsorb up to 93% of this water from the hydrogen cyanide until the hydrogen cyanide contains less than about 0.03% of water, separating the zeolite from the hydrogen cyanide, and removing the adsorbed water from the zeolite to prepare the zeolite for reuse.

References Cited in the file of this patent

UNITED STATES PATENTS

| | | |
|---|---|---|
| 1,712,297 | Fick | May 7, 1929 |
| 2,847,280 | Estes | Aug. 12, 1958 |

OTHER REFERENCES

Barrer: "Separation of Mixtures Using Zeolites as Molecular Sieves, Part I, Three Classes of Molecular-Sieve Zeolite," Journal of the Society of Chemical Industry, Transactions and Communications, vol. 64, May 1945, pp. 130–131.